United States Patent [19]

Modera et al.

[11] Patent Number: 4,635,469
[45] Date of Patent: Jan. 13, 1987

[54] METHODS AND APPARATUS FOR MEASURING THE TIGHTNESS OF ENCLOSURES

[76] Inventors: Mark P. Modera, 3815 Brighton Ave., Oakland, Calif. 94602; Max H. Sherman, 461 Hudson St., Oakland, Calif. 94618

[21] Appl. No.: 747,556

[22] Filed: Jun. 21, 1985

[51] Int. Cl.[4] .............................................. G01M 3/26
[52] U.S. Cl. ............................................................ 73/40
[58] Field of Search .................................. 73/40, 49.2

[56] References Cited

U.S. PATENT DOCUMENTS

| | | | |
|---|---|---|---|
| 4,116,043 | 9/1978 | Pencak | 73/40 |
| 4,363,236 | 12/1982 | Meyers | 73/40 |
| 4,420,969 | 12/1983 | Saum | 73/40 |
| 4,445,364 | 5/1984 | Stieff | 73/40.7 |
| 4,449,393 | 5/1984 | Tucker et al. | 73/40 |
| 4,510,791 | 4/1985 | Yuill | 73/40 |
| 4,517,826 | 5/1985 | Cole et al. | 73/40 |

OTHER PUBLICATIONS

Blomsterberg et al. *Approaches to Evaluation of Air Infiltration Energy Losses in Buildings*, In ASHRAE Transactions, vol. 85, part 1, p. 1979.
M.H. Sherman et al. "The Pressure Leakage Function of a Building", Lawrence Berkeley Laboratory, Nov. 1979.
W.H. Card et al. "Air Leakage Measurement of Building by an Infrasonic Method", Syracuse University, Jan. 1978.
W.H. Card et al. "Infrasonic Measurement of Building Air Leakage: A Progress Report", Building Air Change Rate and Infiltration.
Measurements ASTM STP 719, C.M. Hunt et al. Eds., American Society for Testing and Materials, 1980, pp. 73-88.

*Primary Examiner*—Stewart J. Levy
*Assistant Examiner*—Joseph W. Roskos
*Attorney, Agent, or Firm*—Huff & Hanson

[57] ABSTRACT

Disclosed are methods and apparatus for measuring tightness of an enclosure such as a building by utilizing alternating pressurization techniques. One method comprises providing apparatus capable of causing an internal volume change for the enclosure, the apparatus including a means for determining the instantaneous volume change, and a means for determining the instantaneous pressure within the enclosure. The apparatus is operated within the enclosure to change the volume thereof, and at least one of the frequency and the displacement is adjusted to achieve a root mean square pressure in the enclosure approximately equal to a reference pressure. At that pressure, the leakage of the enclosure is determined from the instantaneous displacement and instantaneous pressure values.

20 Claims, 3 Drawing Figures

METHODS AND APPARATUS FOR MEASURING THE TIGHTNESS OF ENCLOSURES

The present invention relates generally to apparatus and methods which are adapted for use in measuring the tightness of enclosures such as buildings and the like, and more particularly, to such apparatus and methods which utilize an alternating or pulsating pressure source as a means to determine tightness.

The U.S. Government has rights in this invention pursuant to Contract No. DE-AC03-765F00098 awarded by the U.S. Department of Energy.

BACKGROUND OF THE INVENTION

The recent escalations in the costs of petroleum products and other types of fuel have focused great attention on means for conserving energy. One area of significant potential savings in energy is in the energy used to heat and cool buildings such as residential homes. The two major sources of energy loss in buildings are themal conduction through walls, ceilings and floors, and infiltration of air where, for example, warm inside air is displaced by cold outside air through cracks, holes and other openings in the structure of the building. Techniques for minimizing energy losses by conduction in both new and old buildings are well known (insulating materials of various kinds, storm windows and doors, etc.) and has been well publicized both by public service agencies and commercial manufacturers.

On the other hand, it is not nearly as generally appreciated that in most buildings, new or old and with or without adequate insulation, air infiltration is still a major source of heat loss. According to one estimate, from 15 to 67% of the total heating energy utilized in residential buildings is due to the infiltration of air. Furthermore, with the exception of weatherstripping around doors and windows and exterior caulking, it is still not general practice in new residential construction to build with a goal of reducing air infiltration to the minimum practical level. Older houses, built in the era of cheap energy, are even worse in this regard.

Techniques to minimize air infiltration are known and in general are relatively inexpensive to accomplish. In order to promote the more widespread application of these techniques and to thereby capitalize on the potential energy savings realized by the use of these techniques, a simple and economical testing device to measure air infiltration in residential homes and other buildings should be made widely available. To be effective, such a testing device should be able to quickly determine how serious a problem air infiltration is in a given structure, and also should be capable of indicating the effectiveness of the steps taken to reduce the air infiltration.

An instrumental technique known as a gas or fan pressurization has been used for estimating the resistance of enclosures to air infiltration. In this technique, a device having a variable-speed fan is utilized to establish a given pressure differential between the interior and exterior of the enclosure and the flow rate through the fan is then measured. Although it is the air leakage at low (weather-induced) pressures ($-5\,Pa < \Delta P < 5\,Pa$) that is needed to model infiltration, the pressure differences induced by fan pressurization typically range between $\pm 10$ to $\pm 50$ Pa. The tests are made at higher pressures because weather-induced pressures interfere with measurements and thus cause large measurement uncertainties at low pressures. This lack of precision at low pressures is one of the major disadvantages of the fan pressurization technique.

In Lawrence Berkeley Laboratory report No. LBL-9162 entitled "THE LOW PRESSURE LEAKAGE FUNCTION OF A BUILDING" by M. H. Sherman, D. T. Grimsrud and R. C. Sonderegger (November 1979), a method for measuring the air leakage in buildings was described which utilized alternating pressurization. With this technique, measurements were made at pressures similar to natural conditions rather than at artificially high pressures required by fan pressurization techniques. The device described in the report comprised a large piston and guide and sleeve assembly that was installed in place of the existing exterior door. A motor and crank mechanism moved the piston back and forth within the guide, pumping air in and out of the building.

Another report entitled "Infrasonic Measurement of Building Air Leakage: A Progress Report" by W. H. Card et at, ASTM Special Technical Publication No. 719, also investigated alternating pressurization as a means of qualifying tightness. However, neither of these approaches outlined above, among other things, was able to produce an apparatus which could produce an accurate real-time determination of tightness of an enclosure nor an apparatus that could be used easily and conveniently.

SUMMARY OF THE INVENTION

It is therefore an object of the present invention to provide methods and apparatus which are capable of measuring tightness of an enclosure in an accurate manner and on a real time basis.

It is another object of the present invention to provide methods and apparatus by which air infiltration determinations can be easily conducted in the field.

The subject invention, at least in part, is based on the following realizations regarding alternating pressurization in tightness measurements: When the interior of our enclosure is subjected to pressure change due to periodic volume changes, the amount of air leakage in the enclosure affects both the amplitude and the phase of the pressure changes. If the enclosure is assumed to be rigid, the measured volume change and pressure response can be used to calculate the airflow through the enclosure during alternating pressurization. If there are no leaks whatsoever, the change in pressure can be precisely determined from the volume of the structure and the displacement of the piston. Therefore, any deviation from this predicted pressure change can be attributed to leakage through the enclosure. In general, most enclosures including building structures are not rigid, and when the pressure inside the enclosure changes, the enclosure flexes to counteract the change in pressure. By assuming that the flexing is proportional to the differential pressure across the enclosure, corrections for this effect can be made.

Basically, apparatus according to the invention includes a volume drive component comprising a piston-like device which provides a sinusoidal change in the internal volume of an enclosure at a measured or specified amplitude and frequency, a displacement monitoring component to provide the instantaneous value of the piston displacement, pressure measurement component for measuring the instantaneous pressure response of the enclosure to volume changes, and an analysis/control component which calculates effective leakage area from the displacement and pressure information. Comb filtering this information can improve the precision.

Briefly, the present invention, in its broader aspects, comprises a method for determining a gas leakage value of an enclosure at a reference pressure which comprises providing apparatus capable of causing a internal volume change for the enclosure, the apparatus comprising a piston, means for reciprocating the piston, means for determining the instantaneous displacement of the piston, means for determining the instantaneous pressure within the enclosure, and means for determining the leakage value from value of the instantaneous displacement and the instantaneous pressure, operating said piston within said enclosure to change the volume thereof; adjusting at least one of the frequency and the stroke of the piston to achieve a root mean square pressure in the enclosure approximately equal to the reference pressure, and, at that pressure, determining the leakage of the enclosure from the instantaneous displacement and instantaneous pressure values.

The invention further comprehends an apparatus for determining a gas leakage value for enclosure by causing volume change in the enclosure which comprises a piston confining means for the piston, drive means for producing rotational movement, a linkage between the piston and the drive means such that the piston reciprocates in true sinusoidal motion, means for determining the instantaneous displacement of the piston, means for determining the instantaneous pressure within the enclosure, and means for determining the leakage value from values of the instantaneous displacement and the instantaneous pressure.

The invention further comprehends an apparatus for determining a gas leakage value for an enclosure by causing a volume change in the enclosure which comprises a cylinder having one closed end, a piston within the cylinder thereby defining a closed volume, a fluid-vapor mixture in the closed volume which is capable of evaporating or condensing near room temperature, means for reciprocating the piston within the cylinder, means for determining the instantaneous displacement of the piston, means for determining the instantaneous pressure within the enclosure, and means for determining the leakage value from the values of the instantaneous displacement and the instantaneous pressure.

Further objects, advantages and features of the present invention will become more fully apparent from a detailed consideration of the arrangement and construction of the constituent parts as set forth in the following description taken together with the accompanying drawing.

BRIEF DESCRIPTION OF THE DRAWING

In the drawing,

FIG. 3 is graphical representation of frequency versus pressure amplitude to illustrate the concept of "breakpoint frequency".

DETAILED DESCRIPTION OF THE PREFERRED EMBODIMENTS

Figure 1:
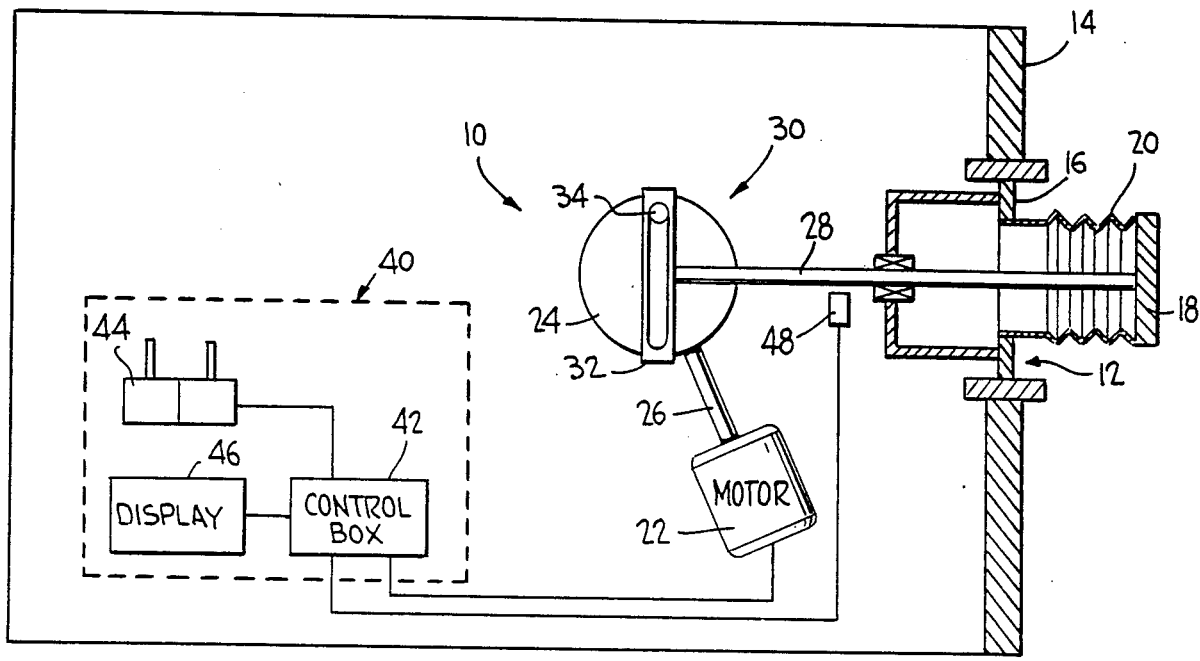
FIG. 1 is a schematic view of one embodiment of an apparatus according to the invention.

Referring now to FIG. 1, shown is an embodiment of an apparatus according to the invention. Apparatus 10 is partially located with aperture 12 of enclosure 14 which is generally a building such as a residential home. Aperture 12 is generally a window, door or other suitable opening in enclosure 14 and the aperture is closed by panel 16 having piston 18 with sealing bellows 20 mounted thereon. Piston 18 is reciprocated by means of electric motor 22 driving flywheel 24 by motor shaft 26, the flywheel being connected to piston shaft 28 by linkage 30 which converts the rotational motion of the motor into true sinusoidal movement by the piston. True sinusoidal motion occurs when a fourier analysis of the velocity of the piston would yield only one non-zero coefficient in a fourier series representation of that motion, the non-zero coefficient being at the angular velocity of the flywheel. As is shown, linkage 30 is one form of a scotch yoke comprising apertured cross-member 32 affixed near one end of piston shaft 28 and radially spaced projection 34 on flywheel 24 extending into the aperture of the cross-member. Other forms of a scotch yoke could be used equally as well.

Apparatus 10 further includes control-monitor assembly 40 which contains analysis control box 42 connected to pressure measuring device 44 and display 46. The pressure measuring device 44 measures the instantaneous pressure response of the enclosure to volume changes. The device need only measure pressure signals at the drive frequency and its harmonics, other frequencies can be filtered out or eliminated with no loss of accuracy. Analysis control box 42 may be a microcomputer using digital analysis or an analogue math processor using analogue analysis. Suitable forms of pressure measuring device 44 include a high-accuracy, low frequency microphone, an inductively coupled pressure transducer and a piezo-resistive solid state pressure transducer. Control box 42 is also connected to motor 22 and velocity sensor 48 adjacent to piston shaft 28. Velocity sensor 48 may provide the piston velocity directly or may be a shaft encoder which uses a sensor to read the position of the shaft, the velocity of the piston being computed from the derivative of the instantaneous shaft position. Velocity sensor 48 can also be implemented with an accelerometer that measures the acceleration of the piston, the velocity being computed from the integral of the acceleration.

In operation of apparatus 10, rotational motion of motor 22 is converted into sinusoidal movement of piston 18 thereby creating a sinusoidal variation of the building volume. The magnitude of the sinusoidal volume change created by the motion of piston 18 can vary between 1 to 500 liters depending on the pressure amplitude desired and the size of the enclosure. It has been found that a displacement of about 10–50 liters works best in most single-family buildings. The frequency can vary between 0.05 to 20.0 Hz depending on the pressure amplitude desired and the size of the enclosure. It has been found that 0.2–2.0 Hz works best for most single-family dwellings.

Upon reciprocation of piston 18, velocity sensor 48 will provide an electrical signal proportional to the velocity of the piston, which is used in combination with the signal from pressure transducer 44 to compute the leakage of the enclosure in analysis/control box 42 which outputs the leakage and any other pertinent information to display 46. Analysis control box 42 also controls the speed of motor 22, thus controlling the frequency of the sinusoidal volume change. The speed of motor 22 can either be controlled manually, or automatically according to predetermined criteria.

One manner in which analysis control box 42 may compute the leakage of the enclosure is by using the equation derived in the following discussion. Previous work in the area of determining or quantifying tightness using the fan pressurization type approach and laboratory methods had determined empirically that the simplest mathematical description of the relationship between the pressure difference and the airflow through leaks is a power law, of the form:

$$Q = C\Delta P^n$$

Because of the exponentiation in the previous expression, the sign of the pressure difference must be taken into account:

$$Q = C |\Delta P|^n \, \text{sign}(\Delta P)$$

With this expression, the measured data can be fit using standard linear regression methods to find the parameters C and n. The regression could be performed on the entire data set to find a single C and n, although separate regressions are usually performed for positive and negative pressure differences because of possible asymmetric leakage.

It is often desirable to convert the leakage (regression parameter) information into an effective leakage area, L. The effective leakage area is determined by assuming that the flow at a particular reference pressure is similar to perfect orifice flow (i.e., a flow exponent of 0.5):

$$Q(P_r) = L \sqrt{\frac{2P_r}{\rho}}$$

The regression parameters (C and n) and the effective leakage area (L) are related as follows:

$$L = C \sqrt{\frac{\rho}{2}} \, P_r^{(n-0.5)}$$

Combining this definition with our power law expression, the flow can be expressed as a function of the leakage area (L) and the flow exponent (n):

$$Q = L \sqrt{\frac{2P_r}{\rho}} \left| \frac{P}{P_r} \right|^n \text{sign}(\Delta P)$$

The pressure-flow relationships in the apparatus of the present invention are more complex than in the fan pressurization type approach. Because reciprocation of piston 18 provides a periodic volume change and thereby induces a periodic pressure response, the flow through the envelope must be determined from the continuity equation for a compressible medium:

$$Q + \dot{V}_d + c\dot{P} = 0$$

Theoretically, this expression could be used to calculate the instantaneous air flow (Q) directly from the measured volume and pressure changes. In practice, this is not possible because of the accuracies required for both the estimation of the capacity, c, and the measurement of the pressure (especially its time derivative). However, because all the terms are periodic, synchronous detection i.e., phase-sensitive detection (see A. Van Der Ziel, *Noise in Measurements,* John W. Wiley and Sons, page 91) is used to analyze the data and increase the accuracy. This analysis can also be termed "phase-locked analysis". Specifically, the precision requirements are lowered by extracting the component that is in phase with the pressure signal:

$$<Q\Delta P> + <\dot{V}_d \Delta P> + c<\dot{P}\Delta P> = 0$$

Because the pressure signal is periodic and the outside pressure is independent of the drive signal, a simplification can be made:

$$<\dot{P}\Delta P> = 0,$$

which leads to the following expression:

$$<Q\Delta P> = - <\dot{V}_d \Delta P>$$

If the previous definition of air flow in terms of effective leakage area is inserted, the following results:

$$L \sqrt{\frac{2P_r}{\rho}} < \left| \frac{P}{P_r} \right|^n \text{sign}(\Delta P) \, \Delta P > = - <\dot{V}_d \, \Delta P>$$

Simplifying and solving for the leakage area yields the following:

$$L = - \sqrt{\frac{\rho}{2P_r}} \; \frac{<\dot{V}_d \frac{\Delta P}{P_r}>}{<\left| \frac{\Delta P}{P_r} \right|^{n+1}>}$$

which can be used to determine the leakage area directly from the measured piston velocity and pressure response.

When using the previously described apparatus to determine leakage area for an enclosure, it is important to operate the apparatus at a frequency below what can be termed "the break-point frequency" for that particular enclosure. The term "break-point frequency" is borrowed from electrical engineering analysis of AC circuits where, for an RC circuit, it is the frequency at which the asymptotes of the resistance-dominated regime (low-frequency) and the capacitance-dominated regime (high-frequency) intersect. When applied to alternating volume changes in a enclosure, the break-point frequency is the frequency at which the pressure-response asymptotes of the leakage-dominated regime (low-frequency) and the compression-dominated regime (high-frequency) intersect. These asymptotes are determined by solving the previous equation at its low-frequency and high-frequency limits. The break-point frequency can be visualized in a plot of the pressure response amplitude versus volume drive frequency can be visualized in a plot of the pressure response amplitude versus volume drive frequency. The typical response curve in FIG. 3 shows the break-point frequency qualitatively. It is effectively a separation between the two regions, and can be expressed as:

$$f_{bp} = \frac{L \sqrt{\frac{2P_r}{\rho}}}{c^n V_d^{1-n} P_r^n}$$

The break-point frequency for most single-family residences is between 1 and 3 Hz; but for large tight houses, it can be as low as 0.5 Hz; and for small leaky houses, it can be as high as 5 Hz.

Because the above analysis does not determine the flow exponent of the leaks, an estimated value of the flow exponent has to be used in the denominator of the equation. The accuracy of the measured leakage area will thus depend on the accuracy of the flow exponent estimation. In a preferred embodiment of the invention, this estimation problem can be avoided if the denominator in the equation is made equal to unity. By running the volume drive to make the (n+1) root mean pressure equal to the reference pressure. Specifically, $$P_{rmn} = P_r$$

where:

$$P_{rmn} = (<|\Delta P|^{n+1}>)^{\frac{1}{n+1}}$$

This (n+1) root mean pressure can be related to the rms pressure, a more easily measured quantity, as the relationship between these two pressures has only a weak dependence on the flow exponent. From a large data set of measured flow exponents, an empirically determined mean value for the flow exponent was determined to be 0.65 with a standard deviation of 0.09, which allows us to express the relationship as:

$$P_{rmn} = 0.97(\pm 0.01) P_{rms}$$

Thus, the measured rms pressure can be used to minimize the impact of the exponent on the analysis by adjusting the volume drive so that:

$$P_{rms} = 1.03 P_r$$

If it is assumed that the exponent-weighted pressure is exactly equal to the reference pressure, the denominator of the basic AC pressurization equation becomes unity and the leakage area can be expressed as:

$$L = -\sqrt{\frac{\rho}{2P_r}} \; \frac{<\dot{V}_d \Delta P>}{P_r}$$

Thus, actively controlling the drive component to keep the pressure at a specified level can simplify the analysis. According to accepted standards for measuring air leakage, the reference pressure in the U.S. is 4 Pa whereas it is 10 Pa in Canada. In the above discussion, the terms have the following meanings:

C=Leakage (regression) coefficient [$m^3/s \; Pa^n$]
c=(Effective) capacity of internal volume [$m^3/Pa$]
$f_{bp}$=Break-point frequency [Hz]
L=Leakage area [$m^2$]
n=Leakage flow exponent [dimensionless]
P=Internal pressure [Pa]
$\Delta P$=Inside-outside pressure difference [Pa]
$P_r$=Reference pressure
$\dot{P}$=Time change in internal pressure [Pa/s]
$P_{rms}$=The cycle-averaged root mean square pressure [Pa]
$P_{rmn}$=The cycle-averaged exponent-weighted pressure [Pa]
$\rho$=Air density [1.2 kg/$m^3$]
Q=Infiltration [$m^3/s$]
$V_d$=Displacement of the drive [$m^3$]
$\dot{V}_d$=Time change of drive displacement [$m^3/s$]
$<\ldots>$=Indicates a cycle average of the enclosed quantity Given that the size of the pressure signal may be constrained, this translates into a constraint on the displacement of the drive component. It can be shown from the continuity equation that the maximum sinusoidal pressure in a building is directly proportional to the displacement of the drive component and the capacity of the building. The total capacity of the building can be determined from the volume of the building and the capacity associated with the flexing of the envelope. Laboratory tests in two buildings provided an approximate relationship between the building capacity due to flexing and that represented by the volume. These tests, indicated that the flexing capacity is approximately one quarter the size of the volume capacity. Thus, by choosing a maximum size for the buildings to be tested, a lower limit for the buildings to be tested, limits for the drivecomponent displacement can be established. These tests also showed that building resonances will not affect the analysis, as they were found to be well above the break-point frequency.

Design constraints on operating frequency are the result of several effects: (1) the size of the volume drive determines the frequency at which the rms pressure will be equal to the reference pressure, (2) precision limitations on the pressure measurements dictate that the tests should be performed below the break-point frequency, as the signal-to-noise ratio drops off near the break-point frequency, and (3) resonance effects tend to occur near the break-point frequency when there are large leaks in the building. These effects indicate that the operating frequency should be as low as possible. On the other hand, limitations on the physical size of the device and the time required to make a test encourage the use of higher operating frequencies. The solution then, is to select a drive amplitude that allows the drive frequency to be in the range immediately below the break-point frequency.

Figure 2:
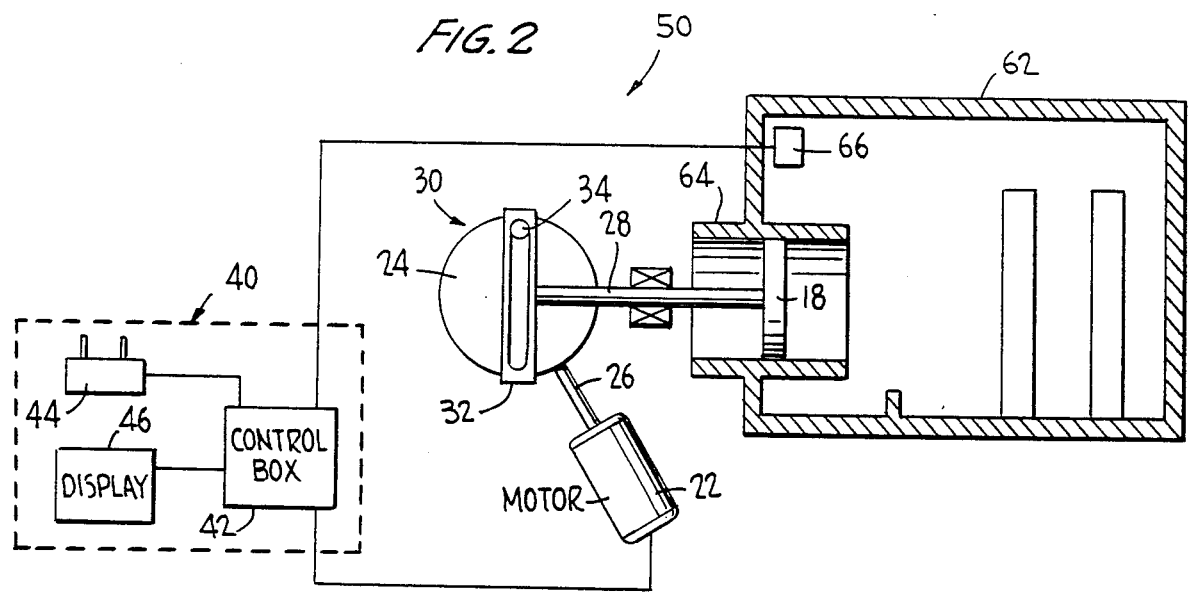
FIG. 2 is an schematic view of another embodiment of an apparatus according to the invention.

FIG. 2 illustrates another embodiment of an apparatus according to the invention which is adapted to be entirely contained within the enclosure being tested. Apparatus 50 is somewhat similar to apparatus 10 of FIG. 1 in that it includes control-monitor assembly 40 which contains analysis control box 42 connected to pressure transducer 44 and display 46. Apparatus further includes a closed-volume 62 comprising cylinder 64 and piston 18. Variable speed motor 22 with motor shaft 26 causes reciprocation of piston 18 in a sinusoidal manner through linkage 30. Pressure transducer 66 measures the instantaneous pressure within closed volume 62 and such information is conveyed to analysis control box 42 where such information is used to calculate displacement and then differentiate to obtain velocity information. Leakage area for the enclosure being tested may be determined in the same fashion as was detailed with reference to the operation of apparatus 10.

Since the gas contained within closed-volume 62 is being compressed to relatively high pressures to achieve sufficient volume change, the power requirements for motor 22 become rather large, particularly for large displacements, and thus the motor cannot be driven from household electricity. Preferably, therefore, closed volume 62 of apparatus 60 contains a mixture of fluids with boiling points near room temperature such as various halogenated hydrocarbons sold under the tradename of Freon such as F-113, F-11 and F-114.

This fluid mixture will condense as it is being compressed and evaporated during expansion to lessen the generated pressure. Since the condensation and evaporation of fluids will generate a considerable amount of heat, the volume must also contain significant amounts of phase-change materials (or equivalent thermal mass) to absorb the heat without changing the temperature. Appropriate phase change materials include those that are currently being investigated by the passive solar community, e.g., salt mixtures, alcohol mixtures etc. (e.g. Glaubersalt).

It should be recognized that the embodiments of FIGS. 1 and 2 can utilize components from each other. For example, the embodiment of FIG. 1 could employ the piston cylinder arrangement of FIG. 2 and the embodiment of FIG. 2 could utilize the piston-bellows management of FIG. 1 as well as the velocity sensor instead of the pressure transducer for the closed volume. In addition, the motor flywheel and shaft for the piston could be located within closed-volume in the embodiment of FIG. 2.

Many features and advantages of the methods and apparatus of the present invention are apparent from the above description. Among others, the invention measures tightness at the pressure differences that actually drive infiltration and thus it is inherently more accurate than fan pressurization which operates at high pressure differentials. The measurement and analysis are done in real time, that is, the leakage area is measured continuously and essentially instantaneously. Thus, while repairing leaks in an enclosure, the apparatus can be left running so that the effects of the repairs can be quantified as they occur. In addition, since the apparatus determines leakage area directly and automatically, little operator training is required and post-test calculations are not necessary.

With the present apparatus, only small volumes of air are exchanged with the outside, which is especially important in severe climates. In contrast, fan pressurization produces 3–20 air changes per hour, which can cause large indoor temperature changes, rain penetration, and/or flue reversal. Embodiments of the apparatus do not pierce the enclosures in testing the enclosure which offers the advantage of both speed and convenience in setup and execution of the infiltration determination.

The invention is illustrated in the following example.

EXAMPLE

An apparatus was constructed according to the design as shown in FIG. 1 and the apparatus used to test a number of single-family dwellings. The apparatus comprised a 60-cm round piston-bellows assembly with a scotch yoke mechanism, a low-frequency microphone, signal-conditioning filters and a computer capable of computing the leakage area as well as intermediate experimental data. The maximum displacement of the apparatus was about 50 liters, which allowed the apparatus to be operated in the 0.1–4.0 Hz frequency range (sufficiently below the breakpoint frequency of most dwellings) and allows the device to be small enough for easy installation in a doorway. The piston-bellows assembly, as well as the DC motor and scotch yoke mechanism that drives it, were mounted in a panel in much the same fashion as standard fan pressurization equipment. The stroke of the scotch yoke mechanism could be varied between about 4 cm and 18 cm, thus allowing the volume to be varied between about 10 and 50 liters.

The frequency of the device was controlled by adjusting the speed of the DC motor. The speed of the piston was monitored with a wire-cable velocity transducer, and the pressure response was monitored with a low-frequency microphone that was sensitive to 0.01 Pa.

Pressurization tests were performed in six houses in the San Francisco Bay area. The houses, which differ in size, age, and air tightness, were chosen to represent a cross section of the houses whose airtightness is normally tested by fan type pressurization. For each of the houses, fan pressurization was used to measure the leakage area and flow exponent, and the subject apparatus (at maximum volume displacement) was used to measure leakage area and pressure response as a function of frequency. Brief descriptions of the houses are presented in Table 1.

TABLE 1

Descriptions of Test Houses

| House | Type | Year Built | Volume $m^3$ | Leakage Area* $cm^2$ | Specific Leakage Area** $[cm^2/m^2]$ |
|---|---|---|---|---|---|
| A | 1 story | 1920 | 360 | 1300 | 9.7 |
| B | 2 story | 1915 | 320 | 1100 | 8.6 |
| C | 2 story | 1909 | 300 | 940 | 6.7 |
| D | 2 story | 1958 | 410 | 700 | 4.3 |
| E | 2 story | 1912 | 530 | 1200 | 5.9 |
| F | 1 story | 1979 | 450 | 580 | 3.4 |

*Based on fan pressurization measurements
**Leakage area divided by floor area

From Table 1, it is apparent that the volumes of the houses vary by a factor of two, as do the leakage areas. The specific leakage areas, which range between 3 and 10 $cm^2/m^2$, are typical for the housing in California, with the exception of supertight construction, where the specific leakage is close to 1 $cm^2/m^2$.

A comparison of the leakage areas measured with alternating pressurization and those measured with fan pressurization is presented in Table 2.

TABLE 2

Comparison of Leakage Areas from alternating and fan pressurization

| House | Leakage Area (Fan Press) | Leakage Area (Fan Press) | Difference [%] | Frequency at 4 Pa [Hz] | Break-Pnt Frequency [Hz] |
|---|---|---|---|---|---|
| A | 1300 | 990 | 24 | 1.11 | 2.6 |
| B | 1100 | 930 | 15 | 1.03 | 2.4 |
| C | 940 | 910 | 3 | 1.04 | 3.4 |
| D | 700 | 600 | 14 | 0.69 | 1.4 |
| E | 1200 | 1000 | 17 | 1.21 | 1.9 |
| F | 580 | 520 | 10 | 0.62 | 1.0 |

All tests performed with fireplace damper closed

The comparisons in Table 2 show that measurements obtained by fan pressurization and alternating pressurization agree reasonably well, but that alternating pressurization values are consistently lower (averaging approximately 14%) than fan pressurization values.

Also, the tests confirmed that, for most houses, a displacement of about 50 liters for the apparatus can provide large enough pressure and can easily provide pressures larger than those required to make $P_{rmn}$ equal to the reference pressure of 4 Pa. In addition, it was able to produce these pressures significantly below the breakpoint frequencies of the houses (i.e., in the region with a high signal-to-noise ratio). In Table 2, the measurement frequency is approximately one half the breakpoint frequency. In addition, the tests showed that, in all houses, the location of the microphone did not affect the measured pressure signal, even when located on the second story of the two-story houses.

While there has been shown and described what is considered to be preferred embodiments of the present invention, it will be apparent to those skilled in the art that various changes and modifications may be made therein without departing from the invention as defined in the appended claims.

It is claimed:

1. A method for determining a gas leakage value of an enclosure at a reference pressure which comprises providing apparatus capable of causing an internal volume change for the enclosure, the apparatus including a means for determining instantaneous volume change, and a means for determining instantaneous pressure within the enclosure, operating said apparatus within said enclosure to change the volume thereof; adjusting at least one of the frequency and the displacement to achieve a root mean square pressure in the enclosure approximately equal to the reference pressure, and, at that pressure, determining the leakage of the enclosure from values of the instantaneous volume change and instantaneous pressure values.

2. A method in accordance with claim 1, wherein the apparatus includes a piston and means for reciprocating the piston.

3. An apparatus for determining a gas leakage value for an enclosure by causing volume change in the enclosure which comprises a piston, confining means for the piston, drive means for producing rotational movement, a linkage between the piston and the drive means such that the piston reciprocates in true sinusoidal motion, means for determining the instantaneous displacement of the piston, means for determining the instantaneous pressure within the enclosure, and means for determining the leakage value from values of the instantaneous displacement and the instantaneous pressure.

4. An apparatus in accordance with claim 3 wherein the linkage is a scotch yoke.

5. An apparatus in accordance with claim 3 wherein the confining means for the piston is a bellows.

6. An apparatus in accordance with claim 3 wherein the confining means is an open-ended cylinder.

7. An apparatus in accordance with claim 2 wherein the means for determining the instantaneous displacement of the piston comprises a velocity sensor.

8. An apparatus in accordance with claim 3, wherein the drive means is an electric motor.

9. An apparatus in accordance with claim 3, wherein the means for determining the instantaneous velocity includes an accelerometer.

10. An apparatus in accordance with claim 3, wherein the means for determining the instantaneous velocity includes an instantaneous displacement sensor.

11. An apparatus in accordance with claim 3, wherein the means for determining the instantaneous pressure comprises a microphone.

12. An apparatus in accordance with claim 3, wherein the means for determining the instantaneous pressure comprises a solid-state pressure transducer.

13. An apparatus for determining a gas leakage value for an enclosure by causing a volume change in the enclosure which comprises a cylinder having one closed end, a piston within the cylinder thereby defining a closed volume, a fluid-vapor mixture in the closed volume which is capable of evaporating or condensing near room temperature, means for reciprocating the piston within the cylinder, means for determining the instantaneous displacement of the piston, means for determining the instantaneous pressure within the enclosure, and means for determining the leakage value from the values of the instantaneous displacement and the instantaneous pressure.

14. An apparatus in accordance with claim 13 wherein the closed volume further contains a material that undergoes a phase change in the boiling temperature range of the fluid-vapor mixture.

15. An apparatus in accordance with claim 13 wherein the means for reciprocating the piston comprises a motor having a rotatable output shaft and a linkage connecting the piston and the output shaft such that the piston moves in a true sinusoidal motion.

16. An apparatus in accordance with claim 15 wherein the linkage is a scotch yoke.

17. An apparatus in accordance with claim 13, wherein the means for determining the instantaneous velocity includes an accelerometer.

18. An apparatus in accordance with claim 13, wherein the means for determining the instantaneous velocity includes an instantaneous displacement sensor.

19. An apparatus in accordance with claim 13, wherein the means for determining the instantaneous pressure comprises a microphone.

20. An apparatus in accordance with claim 13, wherein the means for determining the instantaneous pressure comprises a solid-state pressure transducer.

* * * * *